(12) United States Patent
Luscombe et al.

(10) Patent No.: US 6,188,646 B1
(45) Date of Patent: Feb. 13, 2001

(54) HYDROPHONE CARRIER

(75) Inventors: John Luscombe, Sugarland, TX (US); Louis Erath, Abbeville, LA (US); Jim Spackman, Houston, TX (US); David Lamance, Wallis, TX (US); Michael Maples; Gary Craig, both of Houston, TX (US)

(73) Assignee: Syntron, Inc., Houston, TX (US)

( * ) Notice: Under 35 U.S.C. 154(b), the term of this patent shall be extended for 0 days.

(21) Appl. No.: 09/248,393

(22) Filed: Mar. 29, 1999

(51) Int. Cl.$^7$ .................................................. G01V 1/38
(52) U.S. Cl. .................................................. 367/154
(58) Field of Search .................... 367/154, 165, 367/173, 188, 106, 130, 15, 20, 166, 167, 171; 181/110; 174/101.5; 114/224

(56) References Cited

U.S. PATENT DOCUMENTS

| | | |
|---|---|---|
| 2,424,388 | 7/1947 | Duna . |
| 3,675,193 | 7/1972 | Davis . |
| 3,781,778 | 12/1973 | Sawin et al. . |
| 3,900,543 | 8/1975 | Davis ................................ 264/45.3 |
| 4,300,218 | 11/1981 | Kruka et al. ........................ 367/165 |
| 4,491,939 | 1/1985 | Carpenter ............................ 367/20 |
| 4,689,777 | 8/1987 | Yoever ................................ 367/153 |
| 4,809,243 | 2/1989 | Bledsoe et al. ...................... 367/154 |
| 4,818,822 | 4/1989 | Yahraus .............................. 174/53 |
| 4,821,241 * | 4/1989 | Berglund ............................ 367/154 |
| 4,920,523 | 4/1990 | Kruka et al. ........................ 367/188 |
| 4,967,400 | 10/1990 | Woods ................................ 367/21 |
| 4,998,226 | 3/1991 | Henning et al. ..................... 367/149 |
| 5,089,668 | 2/1992 | Harvey ............................... 174/101.5 |
| 5,141,796 | 8/1992 | Harvey ............................... 428/167 |
| 5,251,182 | 10/1993 | Carpenter ............................ 367/20 |
| 5,265,066 | 11/1993 | Svenning et al. ..................... 367/20 |
| 5,361,240 | 11/1994 | Pearce ................................ 367/157 |
| 5,471,436 | 11/1995 | Harvey ............................... 367/154 |
| 5,521,885 | 5/1996 | Harvey ............................... 367/154 |
| 5,600,608 | 2/1997 | Weiss et al. ......................... 367/20 |
| 5,601,046 * | 2/1997 | Berglund ............................ 114/224 |
| 5,781,510 | 7/1998 | Chang et al. ........................ 367/188 |
| 5,943,293 * | 8/1999 | Luscombe et al. ................... 174/101.5 |

FOREIGN PATENT DOCUMENTS 9423313    10/1994    (WO) .

* cited by examiner

*Primary Examiner*—Daniel T. Pihulic
(74) *Attorney, Agent, or Firm*—Felsman, Bradley, Vaden, Gunter & Dillon, L.L.P.

(57) ABSTRACT

A hydrophone streamer including a central member running substantially the length of the streamer with a strength member and a plurality of conductors has formed therein space adapted to receive a plurality of a spaced apart pairs of collars, a cylindrical chamber wall between each of the pairs of collars defining a chamber, and one or more hydrophones within the chamber. The chamber wall has one or more opening through it for the free passage of sea water into the chamber, thereby shielding the hydrophones from extraneous noise while exposing the hydrophones to a seismic signal conducted by the sea water surrounding the streamer.

20 Claims, 3 Drawing Sheets

HYDROPHONE CARRIER

FIELD OF THE INVENTION

The present invention relates generally to the field of seismic exploration and more particularly, to a hydrophone carrier in a marine seismic streamer.

BACKGROUND OF THE INVENTION

Marine seismic exploration operations commonly include towing a seismic streamer behind a vessel. The seismic streamer includes data communications channels, power conductors, one or more strength members, and a number of sound-sensitive hydrophones. To maintain a very nearly neutral buoyancy, the streamer is commonly filled with a ballast fluid, such as kerosene or oil.

As the streamer is towed through the water during seismic operations, its primary function is to receive seismic signals at the plurality of hydrophones from subsurface geological structures, convert these signals to a voltage signal, and transmit these voltage signals to a central receiving station on board the vessel. The seismic signals are very often very weak, and can be masked by noise from a variety of sources. It is therefore imperative that these sources of noise be minimized so as not to interfere with the seismic signal of interest. This means that the signal to noise ratio of the sound receiving apparatus should be as high as possible.

Large diameter fluid-filled cables have achieved excellent signal to noise characteristics, but these cables are expensive, cumbersome, heavy, and not well suited to seismic operations in heavy weather at sea. Consequently, more recent fluid-filled cables have smaller diameters, at the cost of very fine signal quality. However, these smaller diameters cables are more robust, lighter, less expensive, easier to tow and operate, and have demonstrated adequate signal quality in most operating situations.

Even the smaller diameter streamer cables have their ballast fluid contained with a thin plastic jacket, typically 3-4 mm thick. This skin is susceptible to damage during normal streamer deployment and retrieval operations, and may also be easily damaged by objects in the water, by accidental contact with other streamers, and by a number of common hazards. Other internal components of the streamer cable are also susceptible to damage during normal streamer deployment and retrieval and from hazardous operating conditions. These factors, among others, have led to the developments today in solid-filled cables. Solid-filled cables are more robust and suffer less damage from normal operations and hazard conditions.

Solid-filled streamers include groups of hydrophones spaced apart along the length of the cable. Ideally, the hydrophones would be isolated from any noise in the cable, while positioned to receive the maximum amount of the seismic signal of interest. The hydrophones along the cable are commonly mounted within a hydrophone carrier, which is an integral portion of the cable.

Thus, there is a need for a hydrophone carrier in a solid-filled seismic cable which is robust, inexpensive, and easily accessible for repairs while the towing vessel is deployed at sea. The carrier should be as strong as the rest of the cable, during all phases of operation, including steady state steaming, heavy weather (which can induce longitudinal jerks in the cable) and deployment and retrieval operations in which the cable is reeled onto a winch. The carrier should also isolate the hydrophones from noise conducted along the cable, while exposing the hydrophones to the seismic signal without damping the signal.

SUMMARY OF THE INVENTION

The present invention addresses these and other challenges of the prior art in a solid seismic streamer. One or more hydrophones is mounted within a chamber of the streamer and the chamber includes openings which permit sea water to flow into the chamber. The openings also provide for free communication of seismic signals directly onto the hydrophone elements within the chamber.

The chamber is formed by a cylindrical chamber wall, preferably made of titanium, which is formed as a top half and a bottom half which may be bolted together or otherwise joined. The chamber wall mates with a complementary annular groove in each of a pair of collars. The collars are similarly formed as a top half and a bottom half which may be bolted together or otherwise joined. The chamber is also bounded on its interior by a central member, or a covering for the central member. The central member includes the power and data communications conductors, as well as at least one strength member.

The hydrophone element is preferably formed as a pair of opposed piezoelectric elements or fiber optic sensors mounted to a common support structure. The support structure is in turn enclosed within a sealed tube which is filled with a fluid, preferably a nonorganic oil. The piezoelectric elements are electrically coupled through a stuffing tube plugging one end of the tube for connection to the central member. Other structures for the hydrophone element are equally preferred, including a free-flooding hydrophone mounting, or an optical fiber sensor.

These and other features of this invention will be apparent to those skilled in the art from a review of the following description along with the accompanying drawings.

DETAILED DESCRIPTION OF PREFERRED EMBODIMENTS

Figure 1:
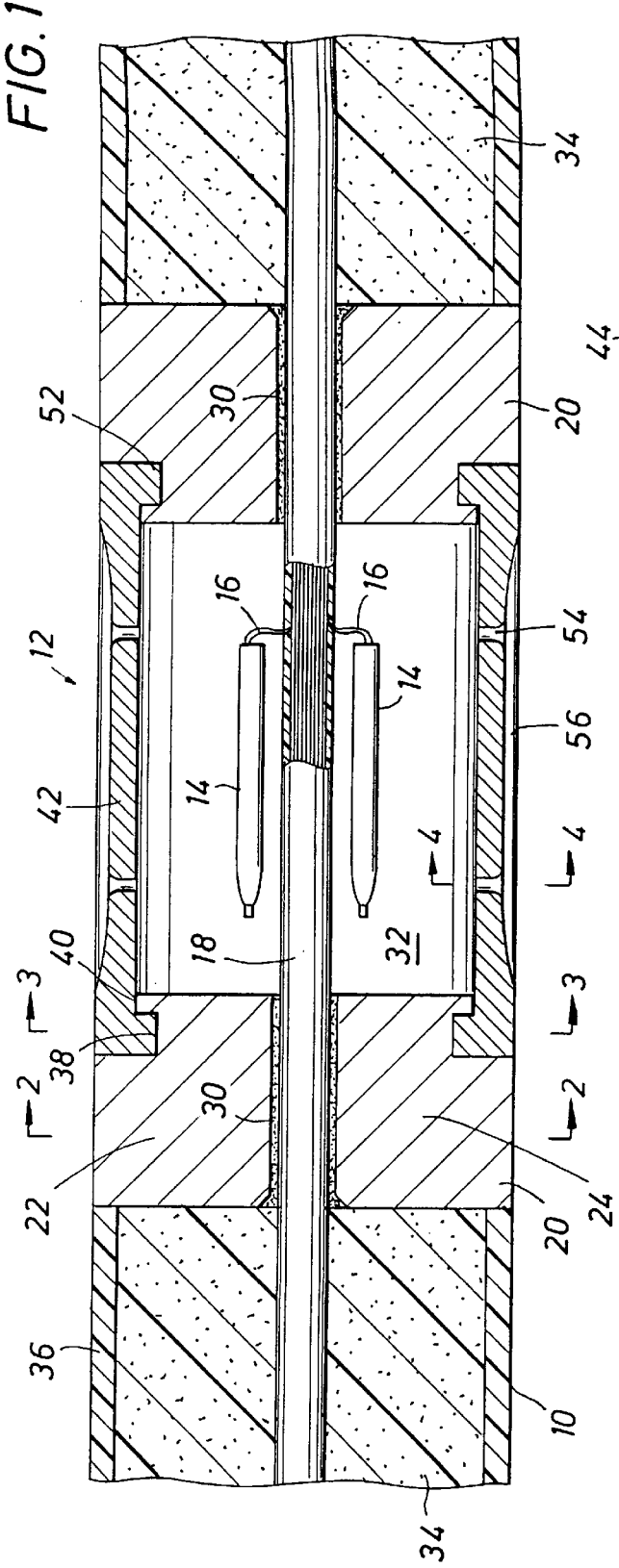
FIG. 1 is a longitudinal cross section of a seismic streamer including the hydrophone carrier of this invention.

FIG. 1 shows a side view of the seismic streamer 10 and its component hydrophone carrier 12 in section. The streamer 10 includes a plurality of hydrophones 14, of which only two are shown. A seismic streamer is commonly kilometers long, and thus may include hundreds of such hydrophones. The hydrophones are depicted as positioned on either side of the streamer, but the streamer may include only one of the pair of hydrophones disposed within the carrier 12, or there may be more than two hydrophones within a carrier, depending on the choice of design and the application.

The hydrophone 14 develops an electrical signal in response to an acoustic stress imparted to the hydrophone and this electrical signal is conducted over a set of wires 16 to a central member 18. The central member, shown in partial section in FIG. 1, includes conductors for data and power, as well as one or more strength members to carry the stress of the length of the streamer. The central member may further include fiber optic data communication channels for carrying the seismic data acquired by the streamer to increase the bandwidth for the data.

Figure 2:
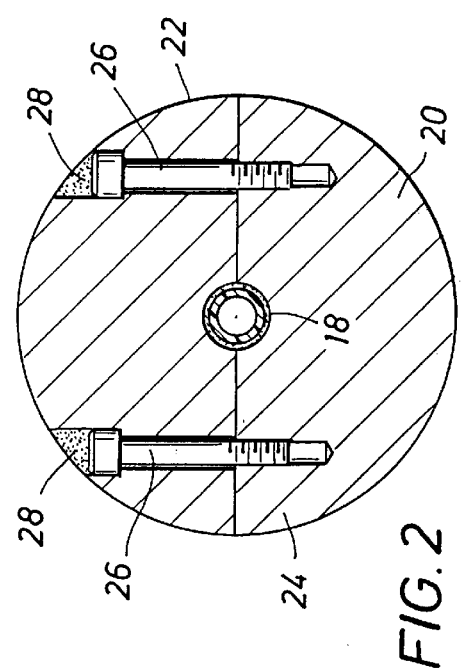
FIG. 2 is an axial cross section of a portion of the hydrophone carrier taken along section 2—2 of FIG. 1.

A set of opposed collars 20 are clamped around the central member 18, as shown in axial cross section in FIG. 2. The collars 20 are made up of a top half 22 and a bottom half 24, held together as by bolts 26, by way of example and not by way of limitation. The smooth contour of the streamer is maintained at the collars 20 by potting the bolt holes with a potting material 28, or by other appropriate means. The collars are also secured to the central member 18 with a potting material 30. The primary function of the potting material 30, however, is to seal a chamber 32, which in operation is filled with sea water, from the remainder of the streamer up and down the central member 18. The central member 18 is enclosed by a polymeric material filler 34 along the streamer between the carriers 12, and the potting material 30 seals against sea water migrating along the central member 18 beneath the polymeric material filler 34.

The filler 34 is preferably of a synthetic plastic that provides approximately neutral buoyancy to the streamer. The filler is surrounded and enclosed by a jacket 36 which provides the smooth, cylindrical surface to the exterior of the streamer. Each of the filler 34 and the jacket 36 is preferably extruded onto the central member 18 in the manufacturing process of the streamer.

Figure 3:
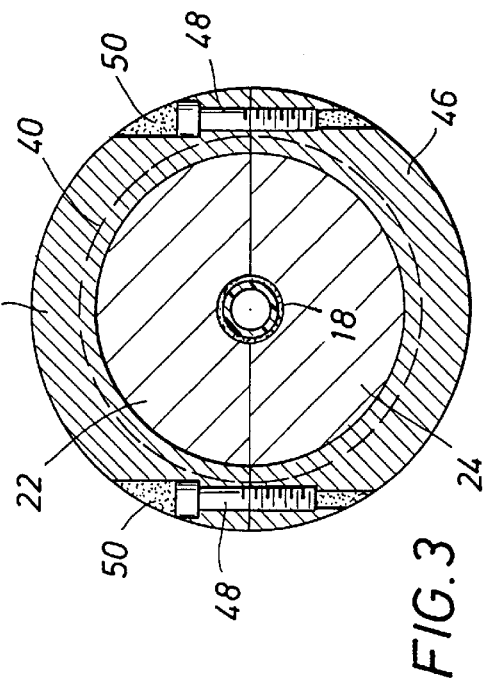
FIG. 3 is an axial cross section of another portion of the hydrophone carrier taken along section 3—3 of FIG. 1.

The collar 20 defines an annular groove 38 and a circular flange 40, which provide a mating surface for a cylindrical chamber wall 42. The chamber wall 42 encloses the chamber 32 and is shown in section in FIG. 3. The chamber wall 42 is made up of a top half 44 and a bottom half 46, held together as by bolts 48, by way of example and not by way of limitation. The smooth contour of the streamer is maintained at the chamber wall 42 by potting the bolt holes with a potting material 50.

Figure 4:
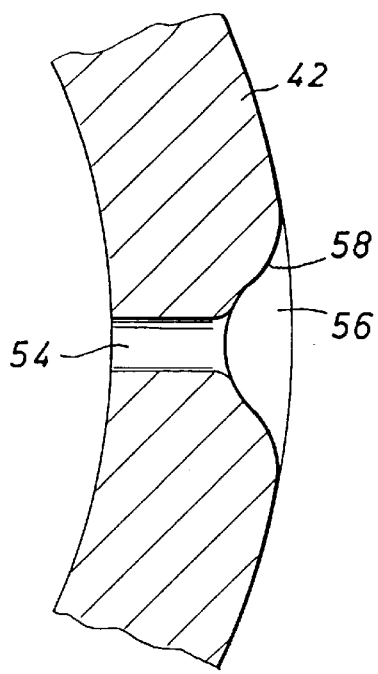
FIG. 4 is a section view of a detail of the carrier of this invention taken along section 4—4 of FIG. 1.
Figure 5:
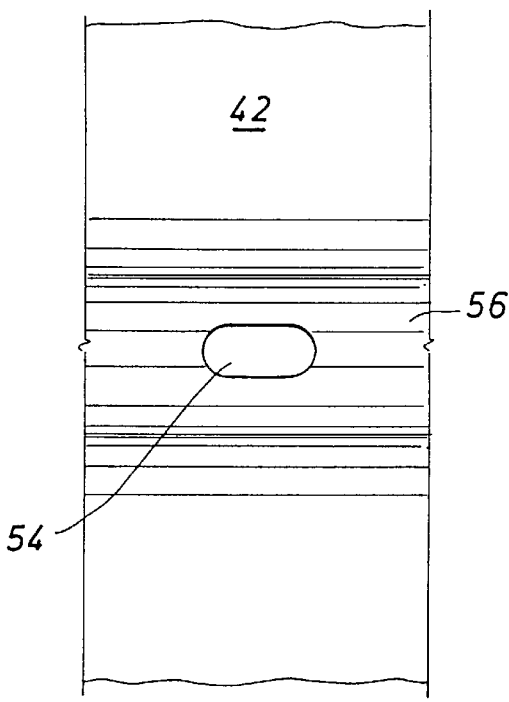
FIG. 5 is a partial side view of a fluid port into the hydrophone carrier.

At each end of the chamber wall 42 is a circular flange 52, which mates with the annular groove 38 and the circular flange 40 of the collar 20. This structure provides strength to the streamer as a whole and defines the chamber 32, which is open to sea water via openings 54, shown in greater detail in FIGS. 4 and 5. The chamber wall 42 present a gently curving contour on its outside surface and the openings 54 are located within an elongate groove 56. The groove 56 presents a gently sloping shoulder 58 down to the opening 54, which offers no sharp corners to the sea water as the streamer is drawn through the water, although other appropriate shapes and contours may be used. This helps to further reduce turbulence and therefore self noise of the hydrophone carrier. Note also that the opening 54 is preferably an elongated circle oriented lengthwise in the groove 56, although other shapes and orientations are also possible.

The purpose of the openings 54 is to permit the free flow of sea water into the chamber 32 and therefore to conduct the seismic signal directly from the water surrounding the streamer into contact with the hydrophones 14. The hydrophones 14, located within the chamber 32, are therefore insulated from exterior disturbances while in direct fluid communication with the seismic signal of interest.

Figure 7:
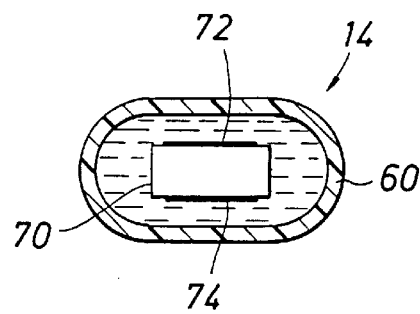
FIG. 7 is an axial section view of the hydrophone and its capsule as taken along section 7—7 of FIG. 6.
Figure 6:
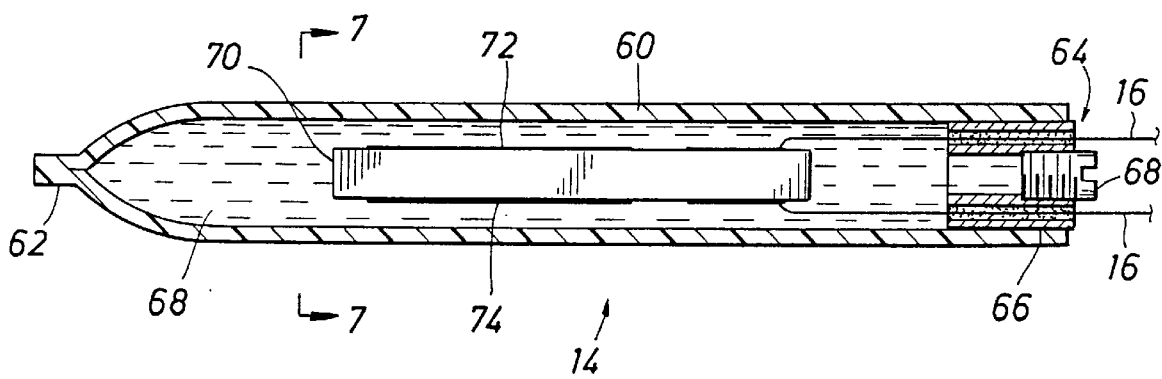
FIG. 6 is a longitudinal section view of a hydrophone and its surrounding capsule.

The hydrophone component 14 is shown in greater detail in FIGS. 6 and 7. This component comprises an elongated tube 60, sealed at one end 62 with an open end 64. The open end 64 of the tube 60 is partly closed with an electrical stuffing tube 66 through which the wires 16 pass. The tube 60 is preferably filled with a fluid 68 of an inorganic oil. The tube 60, once filled with the fluid, is then plugged with a plug 68.

The tube 60 encloses a hydrophone support element 70 on which is mounted a top piezoelectric element 72 and a bottom piezoelectric element 74. This structure may incorporate the low distortion features described in one or more U.S. Pat. Nos. 5,541,894; 5,663,931; 5,675,556; and 5,677,894; all of which are incorporated herein by reference, in order to reduce the effects of the second harmonics of the piezoelectric elements 72 and 74. The support element is shown as a closed parallelepiped, closed on all six sides, with a rectangular cross section. The support element thus is hollow inside and filled with air, so that the top and bottom surface of the support element are free to flex under the influence of a seismic signal and thereby flex the elements 72 and 74 supported thereon.

Figure 8:
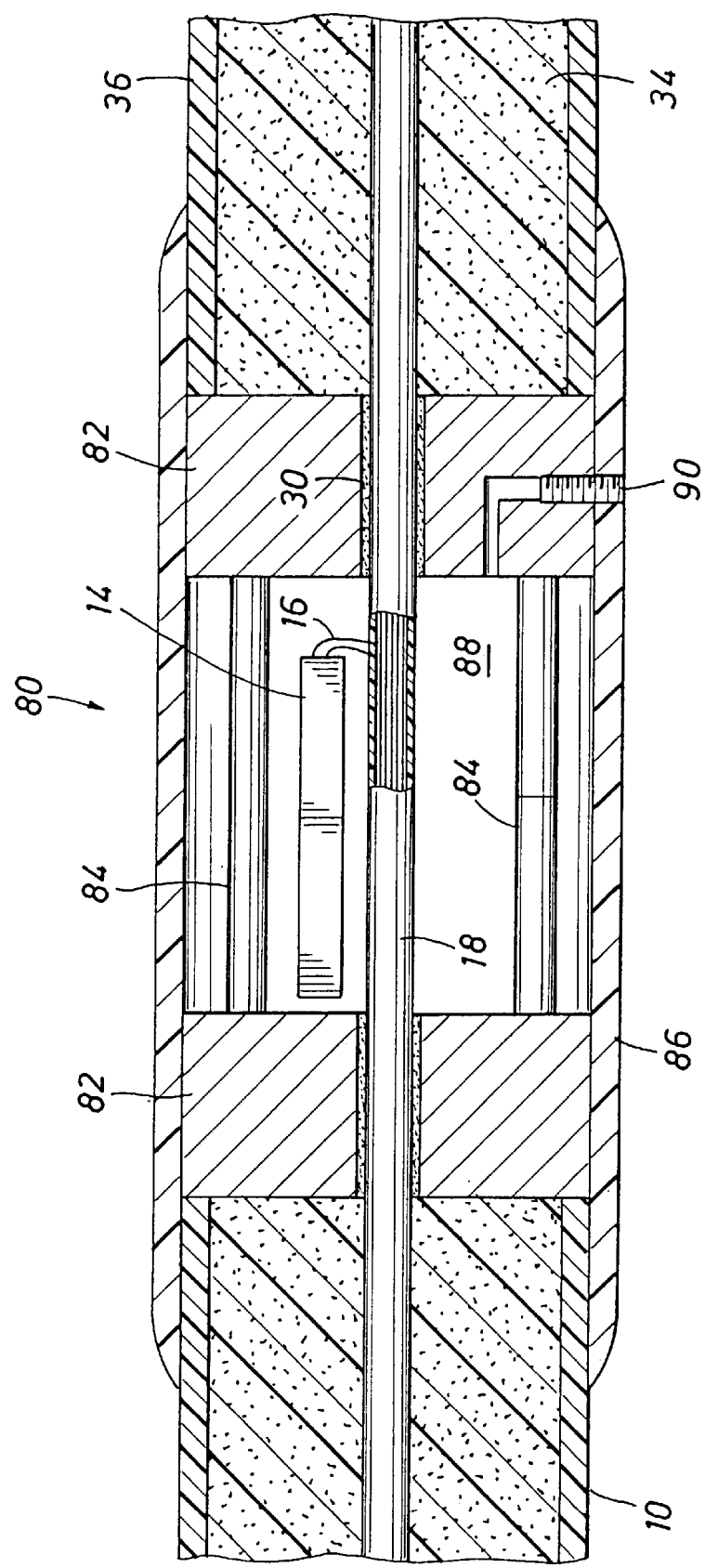
FIG. 8 is a longitudinal cross section of a seismic streamer including another preferred embodiment of the hydrophone carrier of this invention.

FIG. 8 shows a side view of another preferred embodiment of the seismic streamer 10 and its component hydrophone carrier 80 in section. The streamer 10 includes one or more hydrophones 14, of which only one is shown. As with the embodiment of FIG. 1, the hydrophone 14 develops an electrical signal in response to an acoustic stress imparted to the hydrophone and this electrical signal is conducted over a set of wires 16 to a central member 18. The central member is substantially the same as that of FIG. 1 and the hydrophones are constructed substantially as shown in FIGS. 6 and 7.

A set of opposed collars 82 are clamped around the central member 18. The collars 82 are made up of top and bottom halves, and the halves are held together much the same as shown in FIG. 2. The collars 82 are held apart by a pair of rods 84 and one each of the rods 84 may be formed as an integral part of the respective half of the collar 82. In the embodiment of FIG. 8, the structure retains the advantage of distancing the stress bearing rods 84 away from the central member 18 and reducing the amount of noise conducted directly to the hydrophones.

The collars are also secured to the central member 18 with a potting material 30. The central member 18 is enclosed by a polymeric material filler 34 along the streamer between the carriers 80, and the potting material 30 seals against sea water migrating along the central member 18 beneath the polymeric material filler 34. The filler is surrounded and enclosed by a jacket 36 which provides the smooth, cylindrical surface to the exterior of the streamer. Each of the filler 34 and the jacket 36 is preferably extruded onto the central member 18 in the manufacturing process of the streamer.

The collars 82 and the jacket 36 are sealed off by an outer sleeve 86. The outer sleeve 86 is not a stress bearing member, and is made of a pliant material that closely matches the sound transmissive qualities of water. In this way, the hydrophone 14 is more directly subjected to the seismic signal without the interference of intervening materials as in previous designs.

The sleeve 86 forms a chamber 88, which is entirely filled with a fluid, such as water or oil. The chamber is filled through a fill port 90, and more than one port may be provided to assist in venting all the air from the chamber 88 as it is being filled with fluid. The sleeve is preferably bonded against the collars 82 and the jacket 36 to seal the streamer from end to end. The sleeve 86 may also include longitudinal expansion slits which are "welded" once the sleeve is in place to from a tight seal.

Both the carrier of FIG. 1 and the carrier of FIG. 8 provide a solid streamer with a section of the streamer provided for discrete, distributed hydrophones. Thus, both embodiments eliminate the drawbacks of the fluid filled streamers known in the art, while providing a smoothly contoured streamer to reduce self-noise.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A hydrophone streamer comprising:
    a. a central member running substantially the length of the streamer, the central member including a strength member and a plurality of conductors;
    b. a plurality of spaced apart pairs of collars on the central member;
    c. a chamber wall between each of the pairs of collars, the chamber wall defining a chamber, the chamber wall having an opening therethrough for the passage of sea water into the chamber, each of the pairs of collars and the chamber wall between each of the pairs of collars defining a hydrophone carrier; and
    d. a hydrophone element within the chamber.

2. The streamer of claim 1 wherein each of the collars includes an annular groove which mates with a complementary flange on the chamber wall.

3. The streamer of claim 1 wherein each of the collars comprises a top collar half and a bottom collar half.

4. The streamer of claim 3 wherein the top collar half is bolted to the bottom collar half.

5. The streamer of claim 1 wherein the chamber wall comprises a top chamber wall half and a bottom chamber wall half.

6. The streamer of claim 5 wherein the top chamber wall half is bolted to the bottom chamber wall half.

7. The streamer of claim 1 wherein the chamber wall defines a longitudinal groove on an outside surface and wherein the opening through the chamber wall is located in the groove.

8. The streamer of claim 1, wherein the hydrophone element comprises a piezoelectric element mounted on a support structure, a tube surrounding the piezoelectric element and support structure, a fluid filling the tube, and electrical wires coupling the piezoelectric element to a point outside the tube.

9. The streamer of claim 1, wherein the hydrophone element comprises a fiber optic element mounted on a support structure, a tube surrounding the fiber optic element and support structure, a fluid filling the tube, and signal carriers coupling the piezoelectric element to a point outside the tube.

10. The streamer of claim 1 further comprising a cylindrically formed polymeric filler between each of the hydrophone carriers.

11. A hydrophone carrier on a hydrophone streamer, the streamer including a central member running substantially the length of the streamer, the central member including a strength member and a plurality of conductors, the carrier comprising:
    a. a plurality of a spaced apart pairs of collars on the central member;
    b. a chamber wall between each of the pairs of collars, the chamber wall defining a chamber, the chamber wall having an opening therethrough for the passage of sea water into the chamber; and
    c. a hydrophone within the chamber.

12. The hydrophone carrier of claim 11 wherein each of the collars includes an annular groove which mates with a complementary flange on the chamber wall.

13. The streamer of claim 11 wherein each of the collars comprises a top collar half and a bottom collar half.

14. The streamer of claim 13 wherein the top collar half is bolted to the bottom collar half.

15. The streamer of claim 11 wherein the chamber wall comprises a top chamber wall half and a bottom chamber wall half.

16. The streamer of claim 15 wherein the top chamber wall half is bolted to the bottom chamber wall half.

17. The streamer of claim 11 wherein the chamber wall defines a longitudinal groove on an outside surface and wherein the opening through the chamber wall is located in the groove.

18. The streamer of claim 11, wherein the hydrophone element comprises piezoelectric element mounted on a support structure, a tube surrounding the piezoelectric element and support structure, a fluid filling the tube, and electrical wires coupling the piezoelectric element to a point outside the tube.

19. The streamer of claim 11 further comprising a cylindrically formed polymeric filler in abutting contact with each of the pairs of collars outside the chamber.

20. A hydrophone streamer comprising:
    a. a central member running substantially the length of the streamer, the central member including a strength member and a plurality of conductors;
    b. a plurality of a spaced apart pairs of collars on the central member;
    c. a chamber wall between each of the pairs of collars, the chamber wall defining a chamber;
    d. a pair of longitudinal rods in the chamber, the rods being non-coaxial with the central member; and
    e. a hydrophone element within the chamber.

* * * * *